United States Patent
Qin et al.

(10) Patent No.: US 11,482,256 B2
(45) Date of Patent: Oct. 25, 2022

(54) SYSTEMS AND METHODS FOR VIDEO REPLAYING

(71) Applicant: ZHEJIANG DAHUA TECHNOLOGY CO., LTD., Zhejiang (CN)

(72) Inventors: Changhong Qin, Hangzhou (CN); Shengguo Cao, Hangzhou (CN); Shouyi Wang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/939,223

(22) Filed: Jul. 27, 2020

(65) Prior Publication Data

US 2020/0357444 A1    Nov. 12, 2020

Related U.S. Application Data

(63) Continuation-in-part of application No. 16/507,228, filed on Jul. 10, 2019, now Pat. No. 10,726,876, (Continued)

(30) Foreign Application Priority Data

Jan. 16, 2017    (CN) .......................... 201710033152.5

(51) Int. Cl.
*H04N 9/80* (2006.01)
*G11B 27/00* (2006.01)
(Continued)

(52) U.S. Cl.
CPC .................................... *G11B 27/10* (2013.01)

(58) Field of Classification Search
USPC ................ 386/241, 242, 239, 278, 227, 228
See application file for complete search history.

(56) References Cited

U.S. PATENT DOCUMENTS 6,266,158 B1    7/2001    Hata et al.
7,093,191 B1    8/2006    Jain et al.
(Continued)

FOREIGN PATENT DOCUMENTS

CN    101330604 A    12/2008
CN    104504397 A    4/2015
(Continued)

OTHER PUBLICATIONS

International Search Report in PCT/CN2017/118770 dated Mar. 15, 2018, 4 pages.
(Continued)

*Primary Examiner* — Daquan Zhao
(74) *Attorney, Agent, or Firm* — Metis IP LLC

(57) ABSTRACT

The present disclosure relates to systems and methods video recording and video replaying. The method may include obtaining video data from a video recording device. The method may also include generating an index item corresponding to the video data if the video data includes a key frame, wherein the index item includes an index position of the video recording device corresponding to the key frame, and an offset address used to determine an address where the key frame is stored. The method may further include storing an index table including at least the index item in a video.

20 Claims, 14 Drawing Sheets

Related U.S. Application Data which is a continuation of application No. PCT/CN2017/118770, filed on Dec. 26, 2017.

(51) Int. Cl.
  *G11B 27/10* (2006.01)
  *H04N 5/93* (2006.01)
  *H04N 5/77* (2006.01)

(56) References Cited

U.S. PATENT DOCUMENTS

| | | |
|---|---|---|
| 2002/0048450 A1 | 4/2002 | Zetts |
| 2005/0196153 A1* | 9/2005 | Bullwinkle ............ G11B 27/28 386/231 |
| 2006/0004582 A1* | 1/2006 | Claudatos ........ G08B 13/19695 704/275 |
| 2007/0157268 A1* | 7/2007 | Girish ................. G11B 27/322 725/90 |
| 2010/0111501 A1 | 5/2010 | Kashima |
| 2011/0175999 A1* | 7/2011 | McCormack .......... H04N 7/183 348/143 |
| 2014/0178032 A1 | 6/2014 | Kano |
| 2016/0212422 A1* | 7/2016 | Chen ...................... H04N 19/46 |
| 2017/0359601 A1 | 12/2017 | Sievers et al. |
| 2018/0173956 A1* | 6/2018 | Edpalm .............. G06K 9/00771 |

FOREIGN PATENT DOCUMENTS

| | | |
|---|---|---|
| CN | 106156199 A | 11/2016 |
| EP | 1133180 A2 | 9/2001 |
| WO | 2018130070 A1 | 7/2018 |

OTHER PUBLICATIONS

Written Opinion in PCT/CN2017/118770 dated Mar. 15, 2018, 4 pages.
Extended European Search Report in European Application No. 17891674.8 dated Nov. 22, 2019, 10 pages.

\* cited by examiner

SYSTEMS AND METHODS FOR VIDEO REPLAYING

CROSS-REFERENCE TO RELATED APPLICATIONS

This application is a continuation-in-part of U.S. application Ser. No. 16/507,228, filed on Jul. 10, 2019, which is a continuation of International Application No. PCT/CN2017/118770, filed on Dec. 26, 2017, which claims priority of Chinese Patent Application No. 201710033152.5, filed on Jan. 16, 2017, the contents of which are incorporated herein by reference.

TECHNICAL FIELD

This disclosure generally relates to video surveillance, and more particularly, relates to systems and methods for replaying a target scene in video surveillance.

BACKGROUND

With the development and wide application of the intelligent home techniques, video surveillance is not limited to outdoor and indoor security, but increasingly applied to the home life field, for example, family care for family members. Video surveillance may record and remotely display home life of family members in real time. The family members may be elder at home, left-behind children, or the like, who need to be taken care of. The video surveillance may help users to keep track of conditions of the family members and provide better care for the family members in time. Accidents may be avoided and appropriate measures may be taken in time with the help of the video surveillance.

A pan-tilt-zoom (PTZ) camera is a video capture device that is widely applied to security surveillance. It is characterized by its ability to remotely control the lateral rotation, longitudinal tilt and optical zooming of the camera. Therefore, it is also referred to as a PTZ camera. Comparing with a traditional camera, the PTZ camera may change view angles of the camera by rotating in a horizontal direction and/or a vertical direction, and change a surveillance region according to an actual requirement. The PTZ camera may chance an image magnification by changing a focal length of the camera and/or obtaining a high definition image at a long distance. Therefore, the PTZ camera is more flexible and applied more widely than a tradition surveillance camera in the security surveillance.

However, since the PTZ camera is rotatable and the recorded content may include moving scenes, it usually takes a long time for a user to search for a specific scene in a video recording.

SUMMARY

According to an aspect of the present disclosure, a system is provided. The system may include a video replaying and recording unit, the video replaying and recording unit including at least one non-transitory storage medium and logic circuits in communication with the at least one storage medium. The at least one storage medium may include a set of instructions for replaying a video that includes positions of a video recording device. When the logic circuits execute the set of instructions, the logic circuits may be directed to perform one or more of the following operations. The logic circuits may obtain a target position of the video recording device corresponding to a target scene. Based on the target position, the logic circuits may search an index table associated with the video to determine a target index position of the video recording device, wherein the index table indexes a plurality of positions of the video recording device. The logic circuits may determine an offset address in the index table corresponding to the target index position. The logic circuits may obtain a video clip including the target scene based on the offset address. The logic circuits may replay the target scene in the video clip.

In some embodiments, the index table may include a plurality of index items, and each of the plurality of index items correspond to a key frame of the video and includes a frame type, a time stamp, an offset address, a frame length, and information of an index position of the video recording device.

In some embodiments, the system may further include one or more video recording device in communication with the logic circuits, the one or more video recording device including one or more video recording units mounted on one or more movable platforms. The system may obtain the video including a plurality of key frames. The system may determine whether a video frame of the video is a key frame. In response to the determination that the video frame is a key frame, the system may generate the index item corresponding to the video frame, and store the index item and the video frame in the video.

In some embodiments, in response to the determination that the video frame is not a key frame, the system may stores the video frame in the video.

In some embodiments, the system may further include the video recording device in communication with the logic circuits, wherein the video recording device may include one or more video recording units mounted on one or more movable platform. The logic circuits may control the one or more movable platforms to locate the one or more video recording units to a position, so that the one or more video recording units can intake the target scene in the video. The logic circuits may obtain the position of the one or more video recording units as the target position.

In some embodiments, the logic circuits may obtain an index position of the video recording device from the index table. The logic circuits may compare the index position with the target position of the video recording device. In response to a determination that the difference is smaller than a predetermined value, the logic circuits may determine the index position of the video recording device as the target index position of the video recording device.

According to another aspect of the present disclosure, a method is provided. The method may be implemented on a computing device having at least one processor and at least one computer-readable storage medium. The method may include one or more of the following operations. The processor may obtain a target position of the video recording device corresponding to a target scene. Based on the target position, the processor may search an index table associated with the video to determine a target index position of the video recording device, wherein the index table indexes a plurality of positions of the video recording device. The processor may determine an offset address in the index table corresponding to the target index position. The processor may obtain a video clip including the target scene based on the offset address. The processor may replay the target scene in the video clip.

According to a further aspect of the present disclosure, a non-transitory computer readable medium is provided. The non-transitory computer readable medium may include a set of instructions for replaying a video that includes positions of a video recording device. When at least one processor executes the set of instructions, the at least one processor may be directed to perform one or more of the following operations. The at least one processor may obtain a target position of the video recording device corresponding to a target scene. Based on the target position, the at least one processor may search an index table associated with the video to determine a target index position of the video recording device, wherein the index table indexes a plurality of positions of the video recording device. The at least one processor may determine an offset address in the index table corresponding to the target index position. The at least one processor may obtain a video clip including the target scene based on the offset address. The at least one processor may replay the target scene in the video clip.

According to a further aspect of the present disclosure, a system may be provided. The system may comprise at least one non-transitory storage medium, including a set of instructions for video replaying and video recording, and logic circuits in communication with the at least one storage medium. When executing the set of instructions, the logic circuits are directed to obtain video data from a video recording device; generate an index item corresponding to the video data if the video data includes a key frame, wherein the index item includes an index position of the video recording device corresponding to the key frame, and an offset address used to determine an address where the key frame is stored; and store an index table including at least the index item in a video.

In some embodiments, the logic circuits are further directed to identify a video frame including an event from the video data; obtain an index position of the video recording device corresponding to the identified video frame; generate an event indicator corresponding to the event; and generate an index item based on the event indicator corresponding to the event, the index position of the video recording device corresponding to the identified video frame, and an offset address of the identified video frame.

In some embodiments, the index item further includes a frame type, a time stamp, and a frame length of the identified video frame.

In some embodiments, to identify the video frame including the event from the video data, the logic circuits are directed to obtain an event identification model; and identify the video frame including the event by inputting video frames of the video data into the event identification model.

In some embodiments, the event identification model includes a neural network.

In some embodiments, the video recording device cruises between at least two observation sites corresponding to at least two index positions, respectively, and the logic circuits are further directed to identify video frames including first events at a first observation site of the at least two observation sites; and generate index items corresponding to the first events at the first observation site.

In some embodiments, the logic circuits are further directed to identify video frames including second events at a second observation site of the at least two observation sites; and generate index items corresponding to the second events at the second observation site.

In some embodiments, the logic circuits are further directed to obtain a target position of the video recording device and a target event indicator corresponding to a target event; obtain a video clip including the target event by searching the index table of the video including the video clip based on the target position and the target event indicator; and replay the target event in the video clip.

In some embodiments, to obtain the video clip including the target event by searching the index table of the video including the video clip based on the target position and the target event indicator, the logic circuits are directed to determine a target index position of the video recording device by searching the index table based on the target position of the video recording device, wherein the index table indexes a plurality of positions of the video recording device; identify an index item in the index table based on the target index position and the target event indicator corresponding to the target event; determine an offset address from the identified index item, the offset address being used to determine an address where a video frame include the target event is stored; and obtain the video clip including the target event based on the offset address.

In some embodiments, the logic circuits are further directed to obtain a target position of the video recording device corresponding to a target scene; determine a target index position of the video recording device by searching the index table associated with the video based on the target position of the video recording device corresponding to the target scene, wherein the index table indexes a plurality of positions of the video recording device; determine an offset address in the index table corresponding to the target index position of the video recording device, wherein the offset address is used to determine an address where a key frame corresponding to the target index position of the video recording device is stored; obtain a video clip including the target scene based on the offset address; and replay the target scene in the video clip.

According to a further aspect of the present disclosure, a system may be provided. The system may comprise at least one non-transitory storage medium, including a set of instructions for video replaying and video recording, and logic circuits in communication with the at least one storage medium. When executing the set of instructions, the logic circuits are directed to obtain video data from a video recording device; identify a video frame including an event from the video data; obtain an index position of the video recording device corresponding to the identified video frame; generate an event indicator corresponding to the event; generate an index item based on the event indicator corresponding to the event, the index position of the video recording device corresponding to the identified video frame, and an offset address of the video frame; and store an index table including at least the index item in a video clip.

According to a still further aspect of the present disclosure, a method for video replaying and video recording may be provided. The method may be implemented on a computing device having at least one processor and at least one computer-readable storage medium. The method may comprise obtaining video data from a video recording device; generating an index item corresponding to the video data if the video data includes a key frame, wherein the index item includes an index position of the video recording device corresponding to the key frame, and an offset address used to determine an address where the key frame is stored; and storing an index table including at least the index item in a video.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
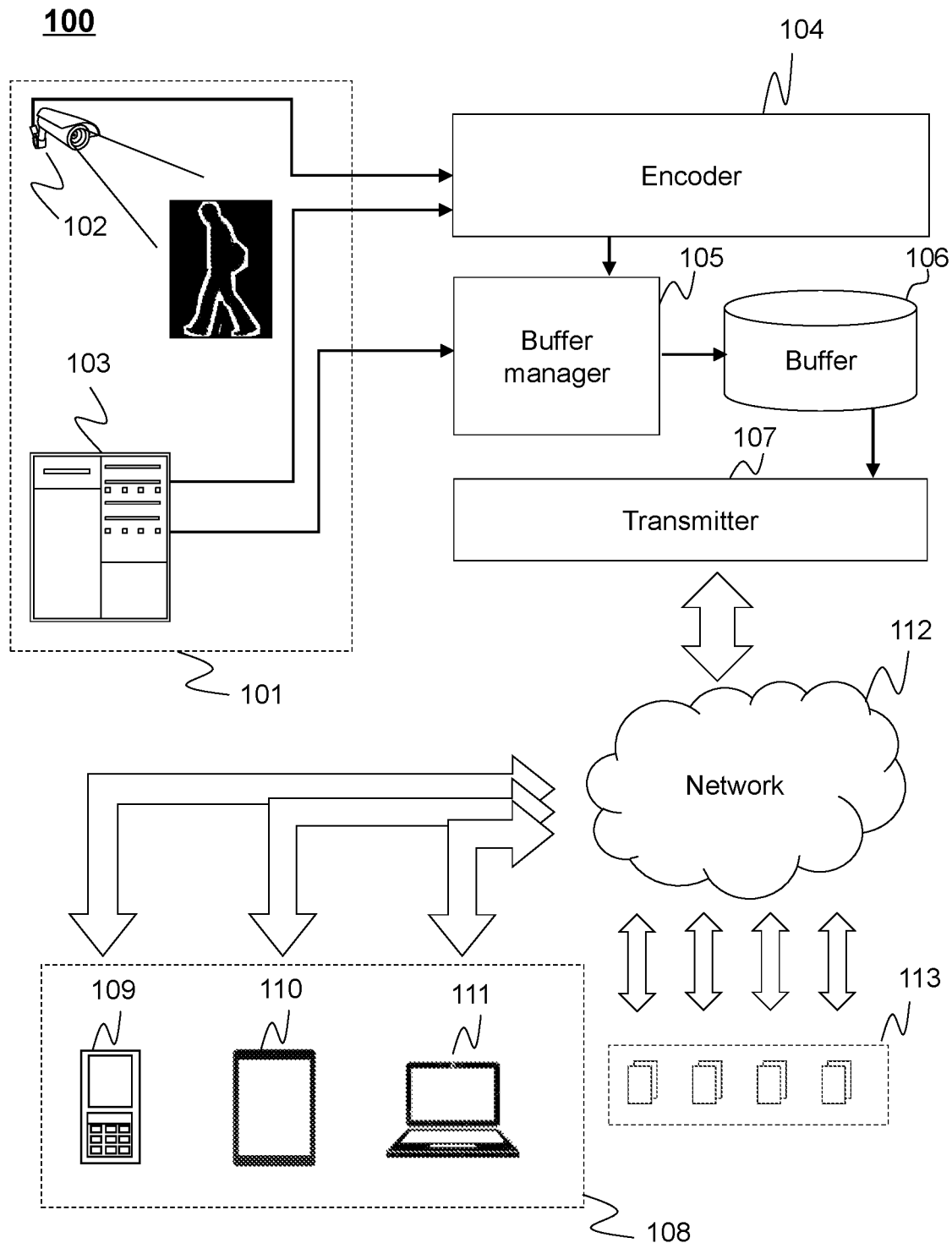
FIG. 1 is a schematic diagram illustrating an exemplary image processing system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

In an aspect, the present disclosure is directed to systems and methods for replaying and recording a video. The system may obtain video data from a video recording device, generate an index item corresponding to the video data if the video data includes a key frame, wherein the index item includes an index position of the video recording device corresponding to the key frame, and an offset address used to determine an address where the key frame is stored, and store an index table including at least the index item in a video.

FIG. 1 is a schematic diagram illustrating an exemplary image processing system according to some embodiments of the present disclosure. The video processing system 100 may be configured to process an image or a video composed of a plurality of images (also referred to as "video frames"). As shown, the video processing system 100 may include a video source 101, an encoder 104, a buffer manager 105, a buffer 106, a transmitter 107, a terminal 108 (or a plurality of terminals 108), network 112, and a network storage device 113 (or a plurality of network storages 113).

The video source 101 may provide a video through the network 112 to a user of a terminal 108. The video source 101 may generate a video itself or via a video transfer site. For example, the video source 101 may include a camera 102 and/or a media server 103.

The camera 102 may be able to capture one or more videos. As used in this application, a video or a video clip may be a video, a stream video, or a video frame obtained from a video. The video may be a three-dimensional (3D) video or a two-dimensional (2D) video. In some embodiments, the camera 102 may be a digital camera, a video camera, a security camera, a web camera, a smartphone, a tablet, a laptop, a video gaming console equipped with a web camera, a camera with multiple lenses, etc.

The camera 102 may include a lens, a shutter, a sensor, a processing device, and a storage device. The lens may be an optical device that focuses a light beam by means of refraction to form an image. In some embodiments, the lens may include one or more lenses. The lens may be configured to intake a scene that a user is interested in. An aperture of the lens may refer to the size of the hole through which light passes to reach the sensor. The aperture may be adjustable to adjust the amount of light that passes through the lens. The focal length of the lens may be adjustable to adjust the coverage of the camera 102.

The shutter may be opened to allow light through the lens when an image is captured. The shutter may be controlled manually or automatically by the processing device.

The sensor may be configured to receive light passing through the lens and transform the light signals of the received light into electrical signals. The sensor may include charge coupled device (CCD) and complementary metal-oxide semiconductor (CMOS). The sensor may be configured to detect the scene from the lens, and transform the scene into electronic signals.

The processing device may be configured to process data and/or information relating to the camera 102 in the present disclosure and/or control one or more components (e.g., the lens, the shutter) in the camera 102. For example, the processing device may automatically determine target values of exposure parameters of the camera 102 such as an exposure time, an exposure gain, and an aperture. The processing device may also adjust quality images taken the camera 102, such as sharpness of the images.

In some embodiments, the processing device may be local or remote. For example, the processing device may communicate with the camera 102 via a network. As another example, the processing device may be integrated into the camera 102.

The storage device may store data, instructions, and/or any other information. In some embodiments, the storage device may store data obtained from the processing device. For example, the storage device may store captured images. In some embodiments, the storage device may store data and/or instructions that the processing device may execute or use to perform exemplary methods described in the present disclosure. In some embodiments, the storage device may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

In some embodiments, the camera 102 may be a pan-tilt-zoom (PTZ) camera. The camera 102 may include or be mounted on one or more movable platforms. The movable platforms may control the camera 102 to move in a certain way. For example, rotate, pivot, translational move, or the like. In some embodiments, the movable platforms may be a PTZ head. The PTZ head may control the lateral rotation, longitudinal tilt, and/or optical zooming of the camera 102 or the lens thereof. For example, the PTZ head may be rotated in a certain range so as to switch the view of the PTZ camera or the lens thereof. For example, the PTZ head may be rotated in 360 degrees in a horizontal plane. As another example, the PTZ head may be rotated in 180 degrees in a vertical plane. As still another example, the PTZ head may be rotated both in the horizontal plane and the vertical plane. Further, the PTZ head may also be a platform configured to perform translational motion to the PTZ camera.

The media sever 103 may be a server (e.g., a computer or a group of computers) for storing, broadcasting, selling, renting, or providing videos. The media server 103 may also include an image and/or video processing electronic device (not shown) configured to process the images and/or video streams from the video source 101 using the methods introduced in the present disclosure.

A "video" provided by the video source 101 may be an electronic medium (e.g., a data file, a bit stream, a series of signal) for the recording, copying, replaying, broadcasting, and display of moving visual media, such as a TV program, an animation, a movie, a surveillance or monitoring video, a video shared through a social platform, an advertisement, a live show, a video call, a video conference, or the like, or a combination thereof. A video may include a plurality of frames, which may also be referred to as video frames. A frame may be one of a plurality of still images that compose a completer video. By sequentially displaying frames (e.g., images) of a video in a rate (frame rate), a video player installed on the terminal 108 may present the video to a user.

Before transmitting a video through the network 112, the video source 101 may send the video to the encoder 104 for encoding the video, or send the video to the buffer 106 through the buffer manager 105. For example, the video provided by the video source 101 may be relatively large in size (e.g., raw video data, video encoded with low compression rate), thus before the transmission the video source 101 may send the video to the encoder 104 for video compression. As another example, the video provided by the video source 101 may be proper in size, and the video source 101 may directly send the video to the buffer 106 through the buffer manager 105 for video transmission.

An encoder 104 may be a remote device from the video source 101 or a local device interpreted in the video source 101. It may encode the video provided by the video source 101 before the video is transmitted through the network 112. Through encoding, the video to be transmitted may be compressed and/or encrypted. For example, the encoder 104 may encode a video using an algorithm for video compression so that the cost (e.g., time cost, resource cost, financial cost) for transmitting the video may be significantly reduced. Alternatively or additionally, the encoder 104 may encode a video using an algorithm for video encryption so that the video may be transmitted safely and a user without permission may not watch the video. The encoder 104 may encode the video frame by frame and generate a plurality of encoded video frames. The encoder 104 may send the encoded video frame to the buffer 106 through the buffer manager 105. Alternatively or additionally, the buffer manager 105 may obtain the encoded video frame from the encoder 104.

In some embodiments, the encoder 104 may encode the video to be transmitted using a Moving Picture Experts Group (MPEG) based encoding technique.

The video frames and/or images to be transmitted may be stored in the buffer 106 in a form of a video frame buffering queue, which may be managed by the buffer manager 105.

The buffer 106 may use a queue based data structure for buffering the video to be transmitted.

The buffer 106 may be a storage device for buffering the video to be transmitted through the network 112. It may be a remote device from the video source 101 or a local device interpreted in the video source 101, such as the storage medium of the camera 102. The buffer 106 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM), such as a dynamic RAM (DRAM), a double date rate synchronous dynamic RAM (DDR SDRAM), a static RAM (SRAM), a thyristor RAM (T-RAM), and a zero-capacitor RAM (Z-RAM). Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The transmitter 107 may transmit the video or video frames buffered in the buffer 106 to the network 112. The transmitter 107 may transmit video or video frames in response to instructions sent from the video provider 101, the buffer manager 105, the terminal 108, or the like, or a combination thereof. Alternatively or additionally, the transmitter 107 may spontaneously transmit video or video frames stored in the buffer 106. The transmitter 107 may transmit video or video frames through the network 112 to the terminal 108 though one or more network connections (wired and/or wireless).

In some embodiments, the transmitter 107 may be capable of determine the transmission performance of the network 112. For example, the transmitter 107 may monitor its data transmitted rate for determining the transmission performance.

The terminal 108 may receive the transmitted video through the network 112. The terminal 108 may decode (e.g., through a video player installed on the terminal 108) the transmitted video or video frames using a decoding algorithm and display the video to a user. The decoding algorithm may correspond to the encoding algorithm used by the encoder 104.

The terminal 108 may be various in forms. For example, the terminal 108 may include a mobile device 109, a tablet computer 110, a laptop computer 111, or the like, or any combination thereof. In some embodiments, the mobile device 109 may include, a wearable device, a mobile device, a virtual reality device, an augmented reality device, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistance (PDA), a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 108 may be part of a processing engine.

The network 112 may include any suitable network that can facilitate a transmission of a video provided by the video source 101 to the terminal(s) 108. The network 112 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 112 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 112 may include one or more network access points. For example, the network 112 may include wired and/or wireless network access points such as base stations and/or internet exchange points through which a video provided by the video source 101 may be transmitted to the terminal 108.

In some embodiments, the network 112 may include one or more network storage devices 113. The network storage device 113 may be a device for buffering or caching data transmitted in the network 112. The video or video frame transmitted by the transmitter 107 may be buffered or cashed in one or more network storage devices 113 before being received by the terminal 108. The network storage device 113 may be a server, a hub, a gateway, or the like, or a combination thereof.

It may be noted that, one or more of the encoder 104, buffer manager 105, buffer 106 and transmitter may be a stand-alone device, or a module integrated into the video source 101 or another stand-alone device. For example, one or more of the encoder 104, buffer manager 105, buffer 106 and transmitter 107 may be integrated into the camera 102 or the media server 103. As another example, the encoder 104, buffer manager 105, buffer 106 and transmitter 107 may be included in a video processing engine which may communicate with the video source 101 through direct wired connection, the network 112, or another network not shown in FIG. 3A. As a further example, the encoder 104 may be a stand-alone device (e.g., a computer or a server), while the buffer manager 105, buffer 106 and transmitter 107 may be included in another stand-alone device.

Figure 2:
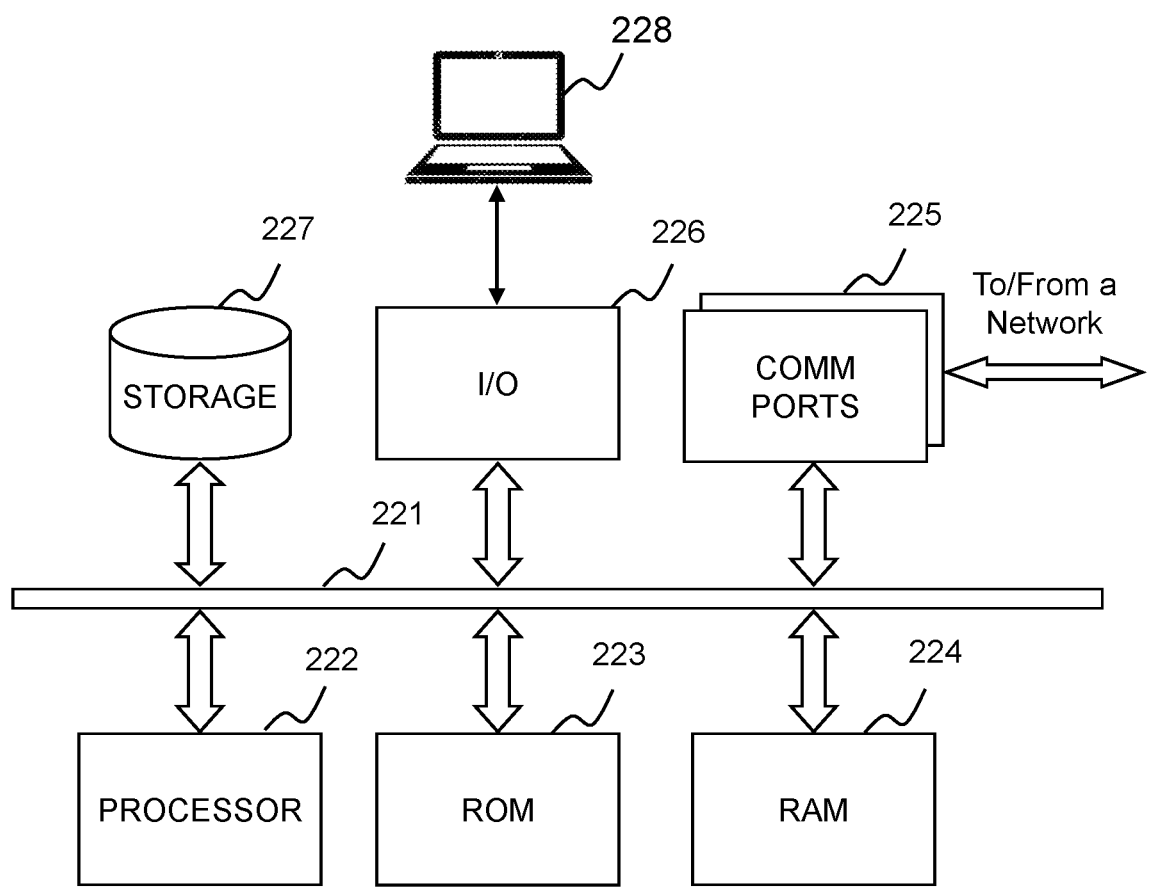
FIG. 2 is a schematic diagram illustrating exemplary components of an exemplary computing device according to some embodiments of the present disclosure.

FIG. 2 is a schematic diagram illustrating exemplary hardware and/or software components of an exemplary computing device according to some embodiments of the present disclosure. For example, the computing device 200 may be the server 103, the processor of the camera 102, and/or an electronic device specialized in video or image processing. The encoder 104 and buffer manager 105 may also be implemented on the computing device 200. As illustrated in FIG. 2, the computing device 200 may include a processor 222, a storage 227, an input/output (I/O) 226, and a communication port 225.

The processor 222 (e.g., logic circuits) may execute computer instructions (e.g., program code) and perform functions in accordance with techniques described herein. For example, the processor 222 may include interface circuits and processing circuits therein. The interface circuits may be configured to receive electronic signals from a bus (not shown in FIG. 2), wherein the electronic signals encode structured data and/or instructions for the processing circuits to process. The processing circuits may conduct logical operations calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. In some embodiments, the processor 222 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 227 may store data/information obtained from the video source 101, the encoder 104, the buffer manager 105, the buffer 106, the transmitter 107, the terminal 108, the network 112, the network storage device 113, and/or any other component of the video processing system 100. In some embodiments, the storage 222 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 222 may store one or more programs and/or instructions to perform exemplary methods described in the present disclosure. For example, the storage 222 may store a program for the processing engine (e.g., the server 103) for determining a regularization item.

The I/O 226 may input and/or output signals, data, information, etc. In some embodiments, the I/O 226 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 225 may be connected to a network (e.g., the network 112) to facilitate data communications. The communication port 225 may establish connections between the video source 101, the encoder 104, the buffer manager 105, the buffer 106, the transmitter 107, the terminal 108, the network 112, the network storage device 113, and/or any other component of the video processing system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 2400 may be and/or include a standardized communication port, such as RS232, RS485, etc. In some embodiments, the communication port 225 may be a specially designed communication port.

Figure 3:
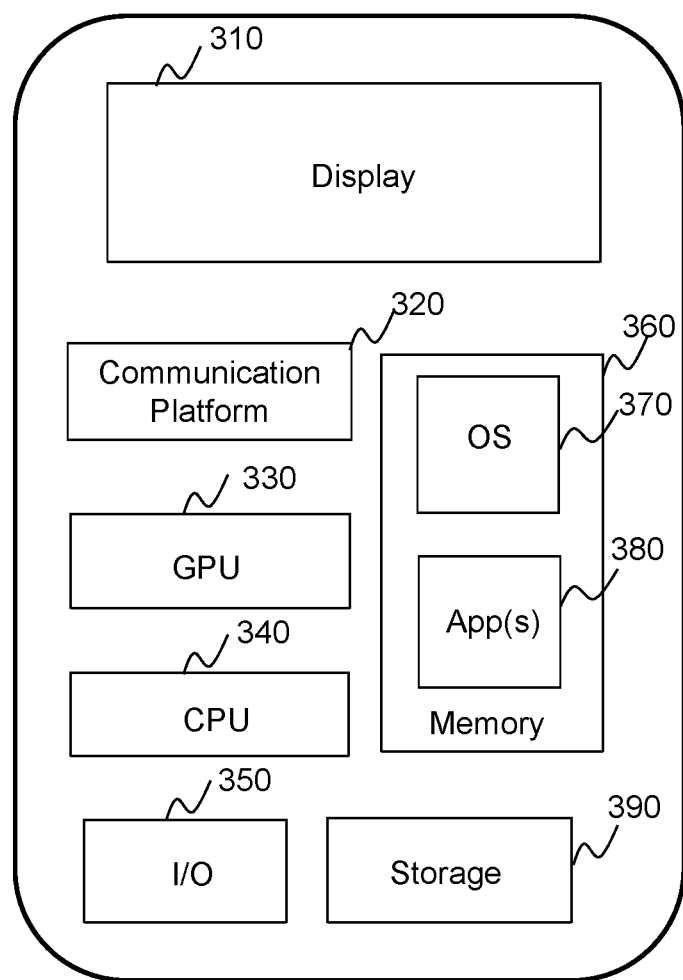
FIG. 3 is a schematic diagram illustrating exemplary components of an exemplary user device according to some embodiments of the present disclosure.

FIG. 3 is a schematic diagram illustrating exemplary components of an exemplary user device according to some embodiments of the present disclosure. As illustrated in FIG. 3, the user device 300 may include a communication platform 320, a display 310, a graphic processing unit (GPU) 330, a central processing unit (CPU) 330, an I/O port 350, a memory 360, and a storage 390. In some embodiments, any other suitable component, including but not limited to a system bus or a controller (not shown), may also be included in the user device 300. In some embodiments, a mobile operating system 370 (e.g., iOS™, Android™, Windows Phone™) and one or more applications 380 may be loaded into the memory 360 from the storage 390 in order to be executed by the processor 340. The user device 300 may be an embodiment of the terminal 108. The applications 380 may include a video player for receiving a video provided by the video source 101 through the network 112 and decode the received video.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
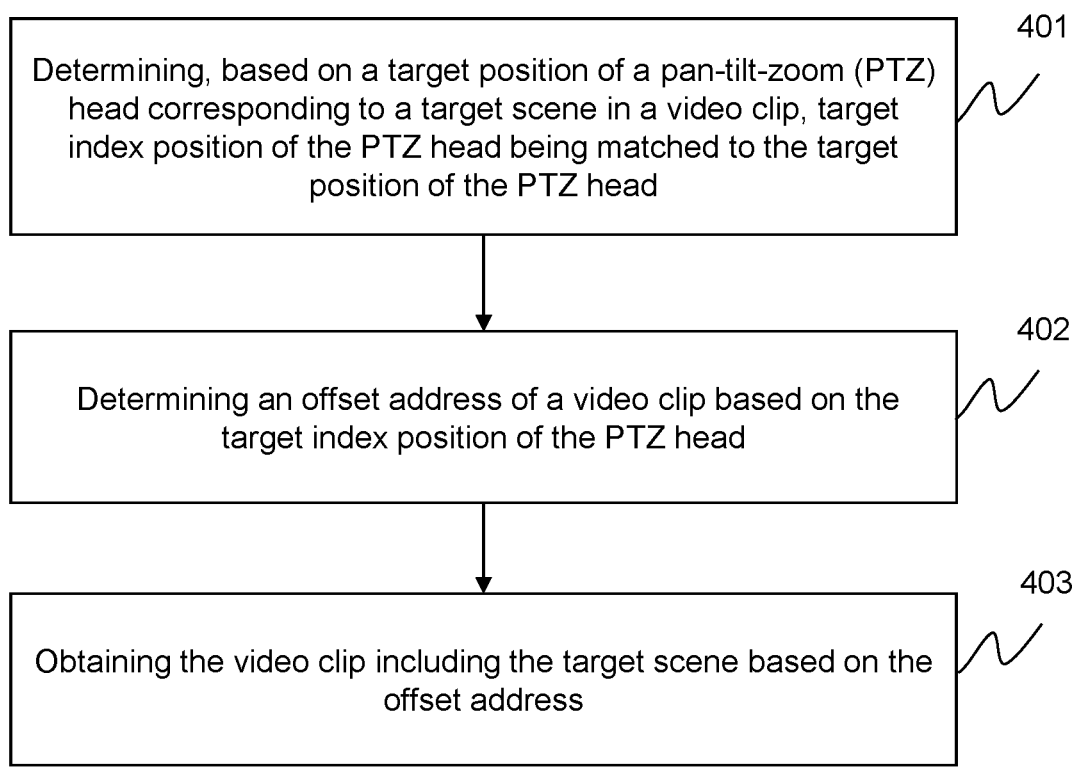
FIG. 4 is a flow chart illustrating an exemplary process for replaying a video clip according to some embodiments of the present disclosure.

FIG. 4 is a flow chart illustrating an exemplary process for replaying a target scene in a video clip according to some embodiments of the present disclosure. In some embodiments, the process 400 may be implemented on the video processing system 100 as illustrated in FIG. 1. For example, the process 400 may be stored in a storage medium (e.g., the network storage device 113, or the storage 227 of the computing device 228) as a form of instructions, and invoked and/or executed by the media server 103. The operations in the process 400 presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below may not be intended to be limiting.

In 401, the media server 103 may perform logical operations to determine, based on target position of a PTZ head corresponding to a target scene in a video to be replayed, target index position of the PTZ head being matched to the target position of the PTZ head. The target scene may refer to a scene that a user wants to view. In some embodiments, the target scene may be a moving scene including a plurality of frames. In some embodiments, the target scene may be a static scene including one frame. The target position may refer to a position of the PTZ head when the camera 102 records one or more frames corresponding to the target scene in a video. The index position may refer to a position of the PTZ head when the camera 102 records a key frame in a video clip. The target index position may refer to an index position of the PTZ head which is matched to the target position of the PTZ head. As used herein, a key frame may refer to a frame that defines starting points and ending points of a smooth transition in a video clip. A key frame may be created when a dramatic change to the scenes in a video clip occurs, for example, the PTZ head rotates.

In some embodiments, a video may include a plurality of key frames and other frames. The other frames may be filled between the plurality of key frames to create an illusion of movement. In some embodiments, the index position of the PTZ head may be stored in an index table. The index table may be a recording file for storing positions of the PTZ head corresponding to key frames. In some embodiments, the media server 103 may generate an index table when the camera 102 records a video clip including one or more key frames. In some embodiments, the index table may include a plurality of index items. Each index item may include, for example, an index position of the PTZ head relating to a key frame, an offset address, etc. The offset address may be used to determine an address where a key frame is stored in a video.

The PTZ head may be a component of the camera 102 or a separated device connected to the camera 102. The PTZ head may be a platform supporting the camera 102. In some embodiments, the video processing system 100 may rotate the camera 102 by rotating the PTZ head. For example, the video processing system 100 may rotate the PTZ head in 360 degrees in a horizontal plane. As another example, the video processing system 100 may rotate the PTZ head in 180 degrees in a vertical plane. As still another example, the video processing system 100 may rotate the PTZ head both in a horizontal plane and a vertical plane.

In some embodiments, the media server 103 may determine a target index position of the PTZ head in an index item from an index table being matched to the target position of the PTZ head. During this process, the media server 103 may obtain coordinates of index positions of the PTZ head in one or more index items of an index table. In some embodiments, the media server 103 may obtain the coordinates of index positions of the PTZ head in the one or more index items one by one. After the media server 103 obtain coordinates of an index position of the PTZ head in an index item, the media server 103 may determine a difference between the coordinates of the index position of the PTZ head and coordinates of the target position of the PTZ head.

As used herein, coordinates of index positions of the PTZ head may refer to coordinates of positions of the PTZ head when the camera 102 records key frames. Coordinates of the target position of the PTZ head may refer to coordinates of a position of the PTZ head when the camera 102 records a frame corresponding to the target scene. In some embodiments, the coordinates of the index positions of the PTZ head and the coordinates of the target position of the PTZ head may be determined in a coordinate system. For example, the coordinate system may be a spherical coordinate system (e.g., longitude and latitude). As another example, the coordinates may be represented by a three-dimensional Cartesian coordinate system. If the difference is smaller than or equal to a first predetermined value, the media server 103 may determine the index position of the PTZ head as the target index position, which is matched to the target position of the PTZ head. For example, the media server 103 may determine the index position of the PTZ head in an index item as the target index position of the PTZ head (i.e., video data corresponding to the target scene has been found), if the difference between coordinates of a current obtained index position and the coordinates of the PTZ head is smaller than the first predetermined threshold. Details regarding the determination of the difference may be found elsewhere in the present disclosure, for example, FIG. 10 and the descriptions thereof.

It should be understood that the media server 103 may obtain each of the coordinates of the index positions of the PTZ head in the one or more index items in sequence. In some embodiments, the sequence may relate to time points when the one or more index items are generated. After the media server 103 obtain coordinates of an index position of the PTZ head in an index item, the media server 103 may determine a difference between the coordinates of the index position of the PTZ head and coordinates of the target position of the PTZ head. The media server 103 may stop obtaining coordinates of index positions of the PTZ head until an index position of the PTZ head in an index item being matched to the target position of the PTZ head.

In some embodiments, the target position of the PTZ head may be determined based on the target scene to be replayed. The target position of the PTZ head may be represented by coordinates of target positions of the PTZ head which include, for example, a rotation angle of the PTZ head in a transverse plane and a rotation angle of the PTZ head in a vertical plane. The index position of the PTZ head may be represented by coordinates of the index position of the PTZ head. The media server 103 may determine a distance between an index position of the PTZ head and the target position of the PTZ head based on coordinates of the index position of the PTZ head and coordinates of the target position of the PTZ head (i.e., the difference between the coordinates of the index position of the PTZ head and coordinates of the target position of the PTZ head). The media server 103 may determine that the index item includes an index position of the PTZ head being matched to the target position of the PTZ head if the distance is smaller than or equal to the first predetermined value. The media server 103 may determine that the index item does not include an index position being matched to the target position of the PTZ head if the distance is greater than the first predetermined value. The media server 103 may further determine whether another index item in the index table includes an index position of the PTZ head being matched to the target position of the PTZ head. The first predetermined value may be used to locate the coordinates of the target position of the PTZ head. The value of the first predetermined value may be set according to various scenarios. For example, the first predetermined value may be set to, for example, 0 degree, 0.5 degree, 1 degree, etc. When the index position of the PTZ head in an index item being matched to the target position of the PTZ head, the media server 103 may determine the index position as a target index position, and obtain the target scene or a scene that is highly similar to the target scene based on the target index position.

In some embodiments, the media server 103 may obtain coordinates of a position of the PTZ head from a control element of the camera 102. The camera 102 may be a PTZ camera, which may intake a different scene when the PTZ head is rotated. The control element may obtain coordinates of a position of the PTZ head. In some embodiments, a display element of the camera 102 may display current coordinates of the position of the PTZ head corresponding to a specific scene when the camera 102 intakes the specific scene. In some embodiments, the media server 103 may obtain coordinates of a position of the PTZ head corresponding to the specific scene based on an input (e.g., from a user) related to the coordinates of the position of the PTZ head.

In 402, the media server 103 may perform logical operations to determine an offset address of a video clip based on the target index position of the PTZ head. The target index position of the PTZ head may be matched to the target position of the PTZ head. In some embodiments, the offset address may include a location related to the video for storing video data. In some embodiments, the offset address may include a physical location related to a storage device (e.g., a hard disk) for storing video data. The offset address may be used to determine an address where a key frame corresponding to the target index position is stored (i.e., an address where a video clip corresponding to the target scene or a scene that is similar to the target scene is stored). In some embodiments, the media server 103 may store the offset address and the corresponding index position of the PTZ head in an index item in a video recording process.

In 403, the media server 103 may obtain the video clip as electronic signals based on the offset address, and then the media server 103 may replay the target scene in the video clip. In some embodiments, the media server 103 may obtain the video clip based on the physical address of the video clip. The media server 103 may replay the target scene in the video clip via a display device (e.g., a screen of the camera 102, a screen of one of the plurality of terminals 108, etc.).

In some embodiments, the media server 103 may set the first predetermined value to a relatively small value (e.g., 0 degree, 0.5 degree, 1 degree, 2 degrees, etc.), and obtain a video clip corresponding to the target scene or a scene similar to the target scene based on the first predetermined value.

In some embodiments, if the video clip does not include the target scene, the media server 103 may replay a video clip corresponding to one or more scenes close to the target scene. More particularly, the media server 103 may obtain a preceding index item and/or a succeeding index item relative to the current index item in an index table. The media server 103 may obtain coordinates of index position of the PTZ head in the preceding index item and/or coordinates of index position of the PTZ head in the succeeding index item. After the media server 103 obtain coordinates of an index position of the PTZ head in the preceding index item or the succeeding index item, the media server 103 may determine a difference between the coordinates of the index position of the PTZ head in the preceding index item or the succeeding index item and coordinates of the target position of the PTZ head. If the difference is smaller than or equal to a second predetermined value, the media server 103 may obtain an offset address corresponding to the index position of the PTZ head in the preceding index item or the succeeding index item. The media server 103 may obtain a video clip based on the offset address, and replay one or more scenes close to the target scene in video clip.

It should be noted that the index items in the index table are generated in time sequence. The preceding index item may be generated before the current index item is generated. The succeeding index item may be generated after the current index item is generated. In addition, the second predetermined value may be larger than the first predetermined value. The media server 103 may set the second predetermined value to be a larger value (e.g., 5 degrees, 8 degrees, 10 degrees, or the like) relative to the first predetermined value. Thus, the coordinates of the index position of the PTZ head may have a larger distance from the coordinates of the target position of the PTZ head, so that the media server 103 may obtain a video clip including one or more target scenes around target scene. In some embodiments, the media server 103 may obtain a plurality of offset addresses sequentially. The media server 103 may obtain a video clip with a longer length based on the plurality of offset addresses.

Figure 6:
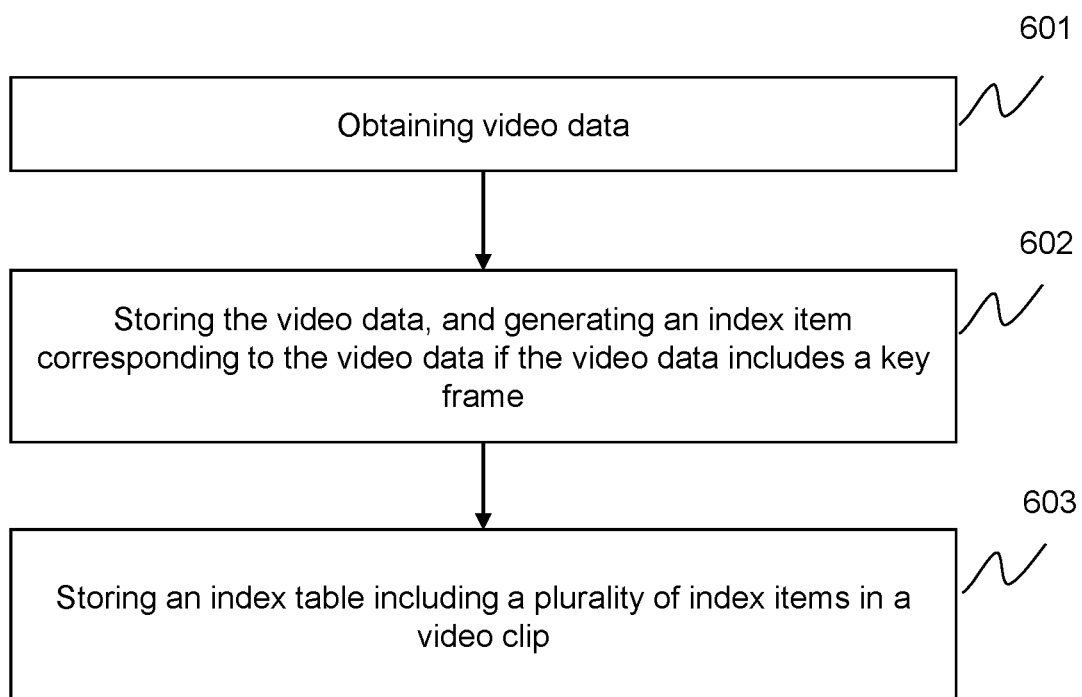
FIG. 6 is a flow chart illustrating an exemplary process for recording a video clip according to some embodiments of the present disclosure.

FIG. 6 is a flow chart illustrating an exemplary process for recording a video clip according to some embodiments of the present disclosure. In some embodiments, the process 600 may be implemented on the video processing system 100 as illustrated in FIG. 1. For example, the process 600 may be stored in a storage medium (e.g., the network storage device 113, or the storage 227 of the computing device 228) as a form of instructions, and invoked and/or executed by the media server 103. The operations in the process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below may not be intended to be limiting.

In 601, the media server 103 may obtain video data from a video recording device. In some embodiments, the media server 103 may obtain the video data from the camera 102. In some embodiments, the camera 102 may include a PTZ head.

In 602, if the video data includes a key frame, the media server 103 may store the video data, or a portion of the video clip, and generate an index item corresponding to the video data or the portion of the video clip. In some embodiments, the video data may include one or more video frames. In some embodiments, the media server 103 may obtain a frame type corresponding to each of the one or more video frames. The media server 103 may determine whether a video frame is a key frame based on the frame type corresponding to the video frame. If the video frame is a key frame, the media server 103 may store the video frame, and generate an index item accordingly. The index item may include, for example, an index position of the PTZ head corresponding to the key frame, and an offset address. The index position may refer to a position of the PTZ head when the camera 102 records the key frame. In some embodiments, the index position may be represented by coordinates of the index position of the PTZ head relative to a coordinate system. The offset address of the video data may refer to an address where the key frame is stored.

Figure 5:
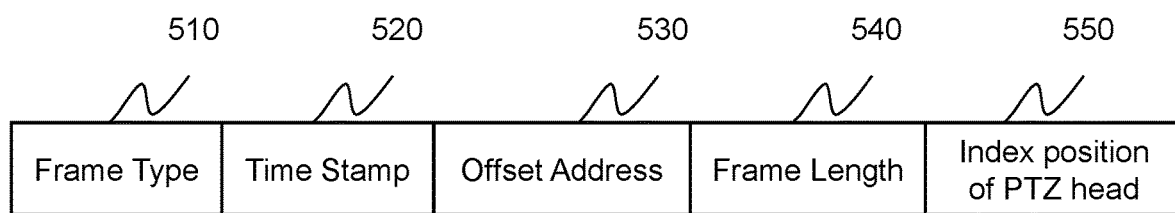
FIG. 5 is a schematic diagram illustrating an index item according to some embodiments of the present disclosure.

In 603, the media server 103 may store the index item in a video clip. In some embodiments, media server 103 may generate a plurality of index items based on the video data. The media server 103 may store the plurality of index items in an index table. For example, the index table may include multiple rows, and the media server 103 may store each index item in a row. In some embodiments, the media server 103 may store the index table in a recording file. The media server 103 may store the video data if the video data does not include a key frame. In some embodiments, the media server 103 may repeat 610 through 630 during a video recording process. During the video recording process, the media server 103 may record one or more key frames, and generate one or more index items, accordingly. In some embodiments, the media server 103 may generate an index table including the one or more index items. As illustrated in FIG. 5, an index item may include, for example, a frame type 510, a time stamp 520, an offset address 530, a frame length 540, and an indexed PTZ head position 550. The frame type 510 may be used to identify a key frame. Exemplary frame types may include an intra-coded (I) frame, a predicted (P) frame, a bi-directional (B) frame, or the like, or a combination thereof. The time stamp 520 may include time information of a key frame. The time information may indicate the time when the key frame is recorded. The offset address 530 refer to an address where a key frame is stored. In some embodiments, the offset address 530 may be a physical address relate to a storage medium (e.g., a hard disk). The frame length 540 may refer to a length of a key frame. The index position of the PTZ head position 550 may refer to a position (e.g., represented by coordinates) of the PTZ head when the camera 102 records the key frame. It should be noted that the key frames may be recorded to guarantee the detection of different scenes in a video recording process, to reduce data volumes of the index items, as well as to improve a detection efficiency. In some embodiments, the media server 103 may record other types of video frames during a video recording process, which is not limited in the present disclosure.

Figure 7:
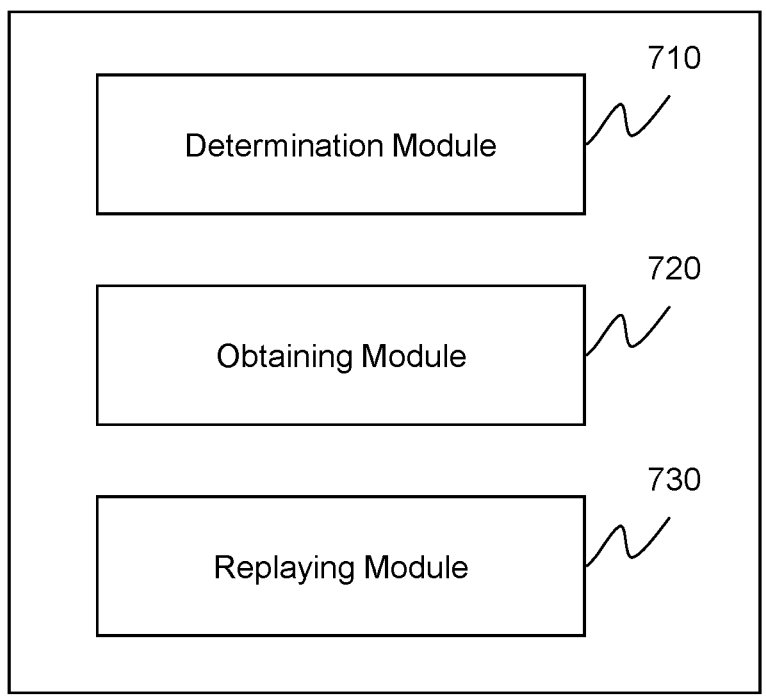
FIG. 7 is a schematic diagram of an exemplary replaying device 700 according to some embodiments of the present disclosure.

The present disclosure may also provide a video replaying device relating to the camera 102. The camera 102 may include a PTZ head for driving one or more lens of the camera 102 to move in a certain way (e.g., pan, tilt, and/or zoom). FIG. 7 is a block diagram of an exemplary video replaying device 700 according to some embodiments of the present disclosure. The video replaying device 700 may include a determination module 710, an obtaining module 720, and a replaying module 730.

The determination module 710 may be configured to determine a target index position from one or more index positions, which is matched to the target position of the PTZ head. In some embodiments, the target position of the PTZ head may correspond to a target scene to be replayed. In some embodiments, an index position of the PTZ head is included in an index item of an index table. The index item may include, for example, the index position, and an offset address. In some embodiments, the index item may further include a frame type, a time stamp, and a frame length.

In some embodiments, the target position of the PTZ head may be represented by coordinates of a target position of the PTZ head. In some embodiments, the index position of the PTZ head may be represented by coordinates of the index position of the PTZ head. The determination module 710 may determine a distance between the target position of the PTZ head and the index position of the PTZ head based on the coordinates of the target position of the PTZ head and the coordinates of the index position of the PTZ head. If the distance is smaller than or equal to a first predetermined value (e.g. a threshold set by a user), the determination module 710 may determine that the index item includes the target index position of the PTZ head corresponding to the target scene. In some embodiments, the determination module 710 may obtain the coordinates of the target position of the PTZ head corresponding to the target scene by rotating the PTZ head until the camera 102 intakes the target scene. More particularly, the determination module 710 may control the one or more movable platforms to locate the video recording device to a position, so that the one or more video recording units can intake the target scene in the video, and obtain the position of the video recording device as the target position. For example, the determination module 710 may rotate, via the logic circuits, the platform to make the video recording device faces towards the scene, so that during operation, the video recording device takes a video including the target scene. In some embodiments, the determination module 710 may obtain the coordinates of the target position of the PTZ head corresponding to the target scene by receiving an input from a user, a device related to the video processing system 100, or the like.

The obtaining module 720 may obtain the offset address corresponding to key frame. In some embodiments, the offset address may be stored in the index item in which the target index position of the PTZ head is stored.

The replaying module 730 may obtain the video clip based on the offset address, and replay the target scene in the video clip. In some embodiments, the replaying module 730 may transmit the video clip to a display device (e.g., a screen of the camera 102, a screen of one of the plurality of terminals 108, etc.).

In some embodiments, the determination module 710, the obtaining module 720, and the replaying module 730 may also be configured to implement the exemplary process 1400.

Figure 8:
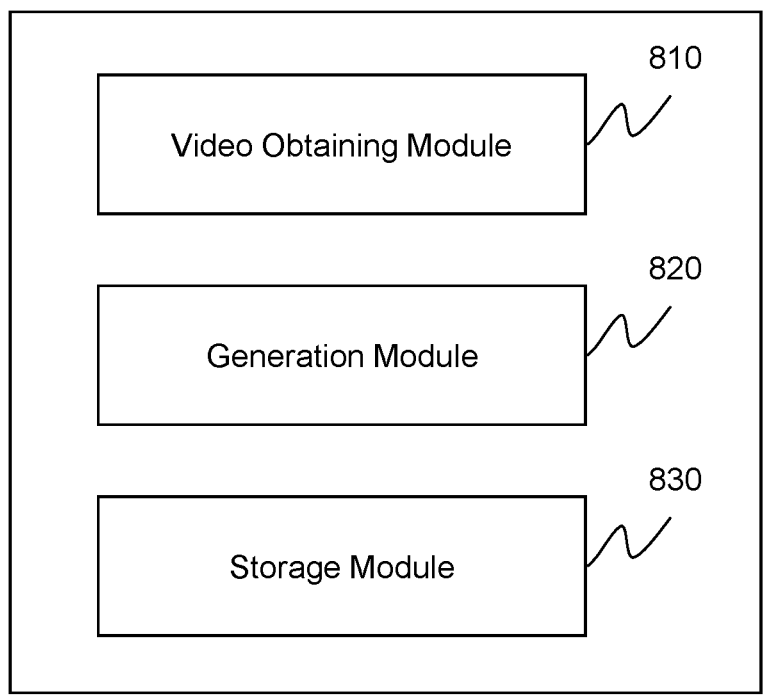
FIG. 8 is a schematic diagram of an exemplary recording device 800 according to some embodiments of the present disclosure.

The present disclosure may also provide a video recording device relating to the camera 102. FIG. 8 is a schematic diagram of an exemplary video recording device 800 according to some embodiments of the present disclosure. The video recording device 800 may include a video obtaining module 810, a generation module 820, and a storage module 830.

The video obtaining module 810 may obtain video data. In some embodiments, the video obtaining module 810 may obtain the video data from a video recording device. The video data may include a video frame. In some embodiments, the video frame may be a key frame.

The generation module 820 may store the video data, and generate an index item corresponding to the video data if the video frame is a key frame. The generated index item may include an index position of the PTZ head and an offset address. The index position of the PTZ head may be a position of the PTZ head when the key frame is recorded. The offset address may be a storage address where the key frame is stored. In some embodiments, if the video data does not include a key frame, the generation module 820 may store the video data without generating an index item.

The generation module 820 may determine whether the video data includes a key frame by identifying a frame type of each video frame included in the video data. In some embodiments, if the video data includes a video frame of a predetermine frame type, the video frame may be determined as a key frame, and the generation module 820 may generate an index item based on the video data.

The storage module 830 may store the index item. In some embodiments, the generation module 820 may generate a plurality of index items. In some embodiments, the storage module 830 may store the plurality of index items in an index table. The index table may include multiple rows, and each row may store an index item. The storage module 830 may store the index table in a recording file.

In some embodiments, the video obtaining module 810, the generation module 820, and the storage module 830 may also be configured to implement the exemplary process 1100.

Figure 9:
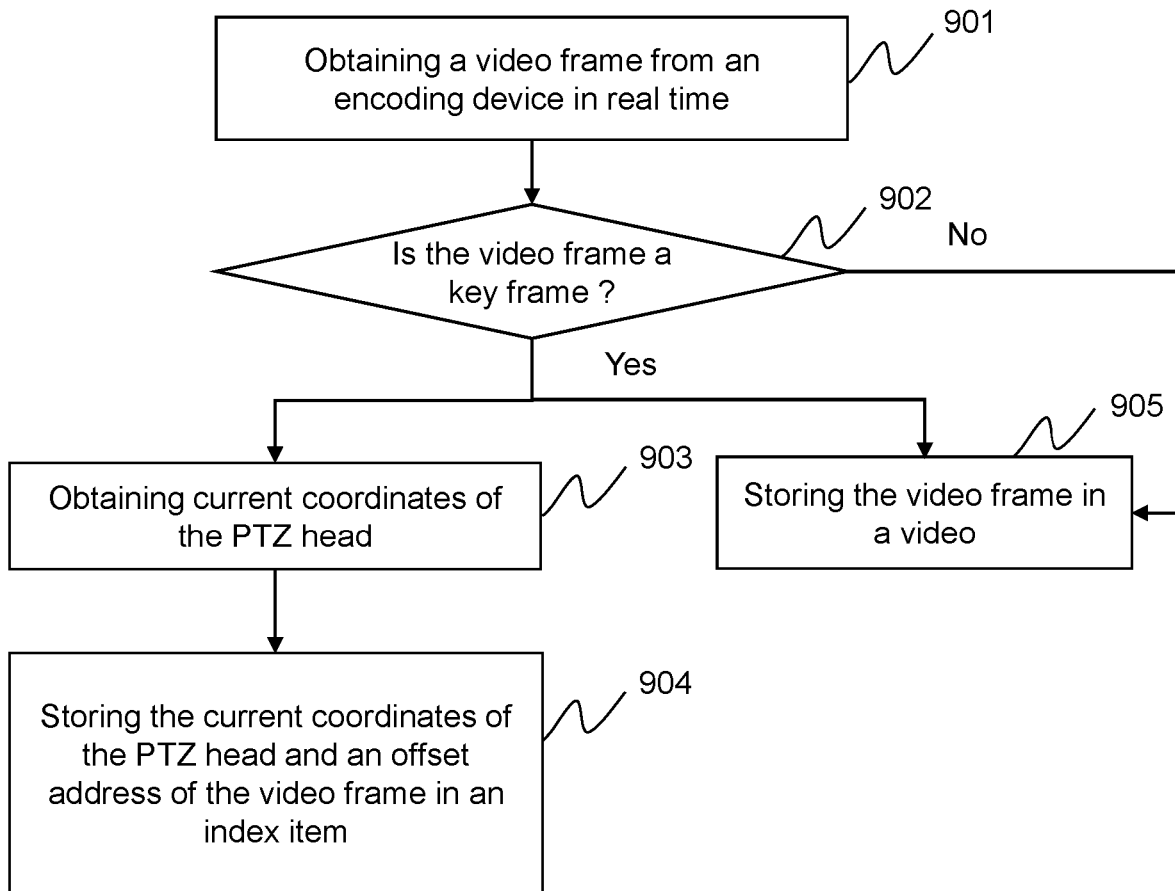
FIG. 9 is a flow chart illustrating an exemplary process for recording a video clip according to some embodiments of the present disclosure.

FIG. 9 is a flow chart illustrating an exemplary process for recording a video clip according to some embodiments of the present disclosure. In some embodiments, the process 900 may be implemented on the video processing system 100 as illustrated in FIG. 1. For example, the process 900 may be stored in a storage medium (e.g., the network storage device 113, or the storage 227 of the computing device 228) as a form of instructions, and invoked and/or executed by the media server 103. The operations in the process 900 presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below may not be intended to be limiting.

In 901, the media server 103 may obtain a video frame from a video recording device. In some embodiments, the media server 103 may obtain the video frame from an encoding device (e.g., the encoder 104) in real time. In some embodiments, the encoding device may send the video frame in forms of data packages. For example, the encoding device may send the data packages one by one. A receiving device (e.g., the media server 103) may receive the data packages one by one, accordingly. In some embodiments, a data package may include one video frame. In some embodiments, if a data package cannot accommodate one frame, the frame may be divided into multiple parts, and each part may be transmitted in a data package.

In 902, the media server 103 may determine whether the video frame is a key frame. The media server 103 may determine whether the video frame is a key frame based on a frame type of the video frame. In some embodiments, the frame type may be stored in a field of a data packet storing the frame. In some embodiments, the field storing the frame type may be located at one end of the video frame (e.g., the header of the data package). If the video frame includes a field of a preset frame type, the media server 103 may determine that the video frame is a key frame.

If the video frame is a key frame, the media server 103 may obtain current coordinates of the PTZ head (also referred to as "coordinates of index position of the PTZ head") in 903, and store the video data including the video frame in a video clip in 905. If the video frame is not a key frame, the media server 103 may store the video data including the video frame in a video clip in 905.

In 903, the media server 103 may obtain current coordinates of the PTZ head. The media server 103 may obtain current coordinates of the PTZ head with various methods. In some embodiments, the media server 103 may obtain the current coordinates of the PTZ head from, for example, a coordinate measuring device, a control element in the camera 102, or the like. In some embodiments, the media server 103 may transmit the current coordinates of the PTZ head to the camera 102 when the coordinates of the PTZ head change.

In 904, the media server 103 may store the current coordinates of the PTZ head and the storage address of the key frame (also referred to as "offset address") into index data. In some embodiments, the index data may take a form of an index item or an index table. The index table may include a plurality of index items. Each of the plurality of index items may be a row in the index table. In some embodiments, a key frame may correspond to an index item of an index table. An exemplary index item may be illustrated in FIG. 5.

In 905, the media server 103 may store the video frame in a video.

Figure 10:
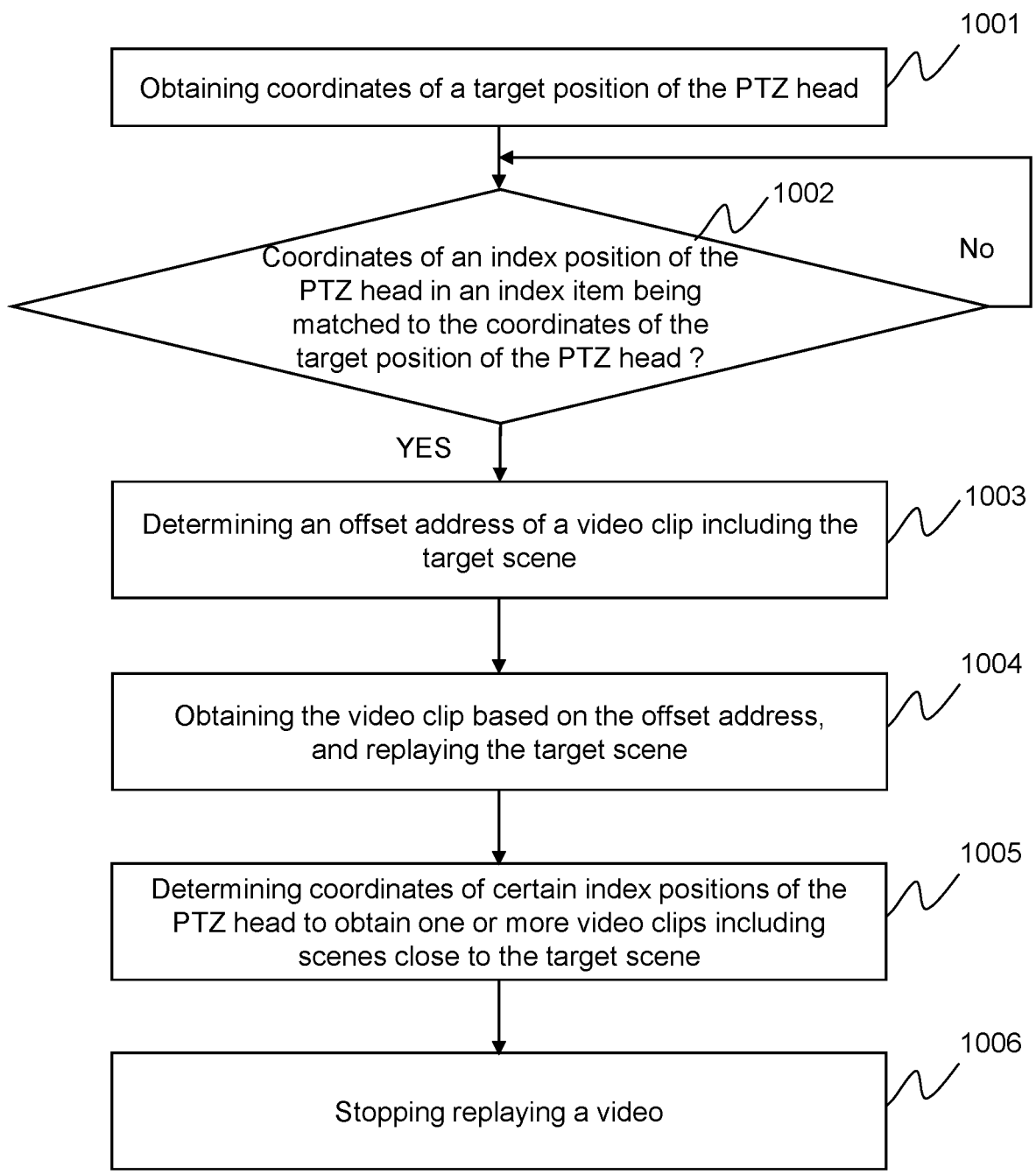
FIG. 10 is a flow chart illustrating an exemplary process for replaying a video clip according to some embodiments of the present disclosure.

FIG. 10 is a flow chart illustrating an exemplary process for replaying a video clip including a target scene according to some embodiments of the present disclosure. In some embodiments, the process 1000 may be implemented on the video processing system 100 as illustrated in FIG. 1. For example, the process 1000 may be stored in a storage medium (e.g., the network storage device 113, or the storage 227 of the computing device 228) as a form of instructions, and invoked and/or executed by the media server 103. The operations in the process 1000 presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below may not be intended to be limiting.

In 1001, the media server 103 may obtain coordinates of a target position of the PTZ head. In some embodiments, the target position of the PTZ head may correspond to a target scene. The target scene may be a scene that a user may be interested in.

In 1002, the media server 103 may determine whether coordinates of an index position of the PTZ head in an index item are matched to coordinates of a target position of the PTZ head. If the coordinates of the index position of the PTZ head are matched to the coordinates of the target position of the PTZ head, the process 1000 may proceed to 1003. If the coordinates of the index position of the PTZ head are not matched to the coordinates of the target position of the PTZ head, the media server 103 may repeat 1002 in another round to determine whether coordinates of an index position of the PTZ head in a succeeding index item are matched to the coordinates of the target position of the PTZ head.

In some embodiments, the first predetermined value may be input by the user, according to default settings of the video processing system 100, etc. For example, the first predetermined value may be 0.5 degree, 1 degree, 2 degrees, or the like. The media server 103 may determine that the coordinates of index position of the PTZ head are matched to the coordinates of the target position of the PTZ head based on a distance between the target position and the index position of the PTZ head. For example, if the distance is smaller than or equal to the first predetermined value, the media server 103 may determine that the coordinates of index position of the PTZ head are matched to the coordinates of target position of the PTZ head. Merely by way of example, the determination in 1002 may be made according to formula (1):

$$(P_1-P_0)^2+(T_1-T_0)^2 \leq S^2, \tag{1}$$

where S denotes the first predetermined value, $(P_0, T_0)$ denotes the coordinates of the target position of the PTZ head, and $(P_1, T_1)$ denotes the coordinates of the index position of the PTZ head in an index item.

In 1003, the media server 103 may determine an offset address. The offset address may correspond to the index position of the PTZ head in the index item. In some embodiments, the offset address may be an address of a video clip related to a storage medium (e.g., a hard disk).

In 1004, the media server 103 may obtain the video clip including the target scene based on the offset address, and replay the target scene.

In 1005, the media server 103 may determine coordinates of certain index positions of the PTZ head to obtain one or more video clips including specific scenes close to the target scene. A difference between the coordinates of the certain index positions of the PTZ head and the coordinates of target position of the PTZ head may be smaller than or equal to a second predetermined value. The media server 103 may obtain the second predetermined value from a user. For example, the second predetermined value may be 5 degrees, 8 degrees, 10 degrees, or the like. In some embodiments, the media server 103 may search forwards from corresponding index data in the index table. Merely by way of example, the determination in 1005 may be made according to formula (2):

$$(P_1-P_0)^2+(T_1-T_0)^2 \leq D^2, \qquad (2)$$

where D denotes the second predetermined value.

In 1006, the media server 103 may stop replaying a video if no video clip is obtained.

In summary, video replaying methods may be provided according to the embodiments set forth above. For a PTZ camera, a target scene may correspond to a target position of a PTZ head. During a video recording process, the media server 103 may record a position of the PTZ head and a storage address in a video when the camera 102 intake a key frame. The media server 103 may establish a corresponding relationship between the position of the PTZ head and the storage address of the key frame in the video. When the media server 103 replays the video, the media server 103 may obtain the storage address of the key frame in the video based on the position of the PTZ head, because the storage address is corresponding to the position of the PTZ head. The media server 103 may obtain a video clip of the video related to a target scene based on the storage address, and replay the video clip. The media server 103 may further obtain a video clip including a specific scene similar to or close to the target scene.

Figure 11:
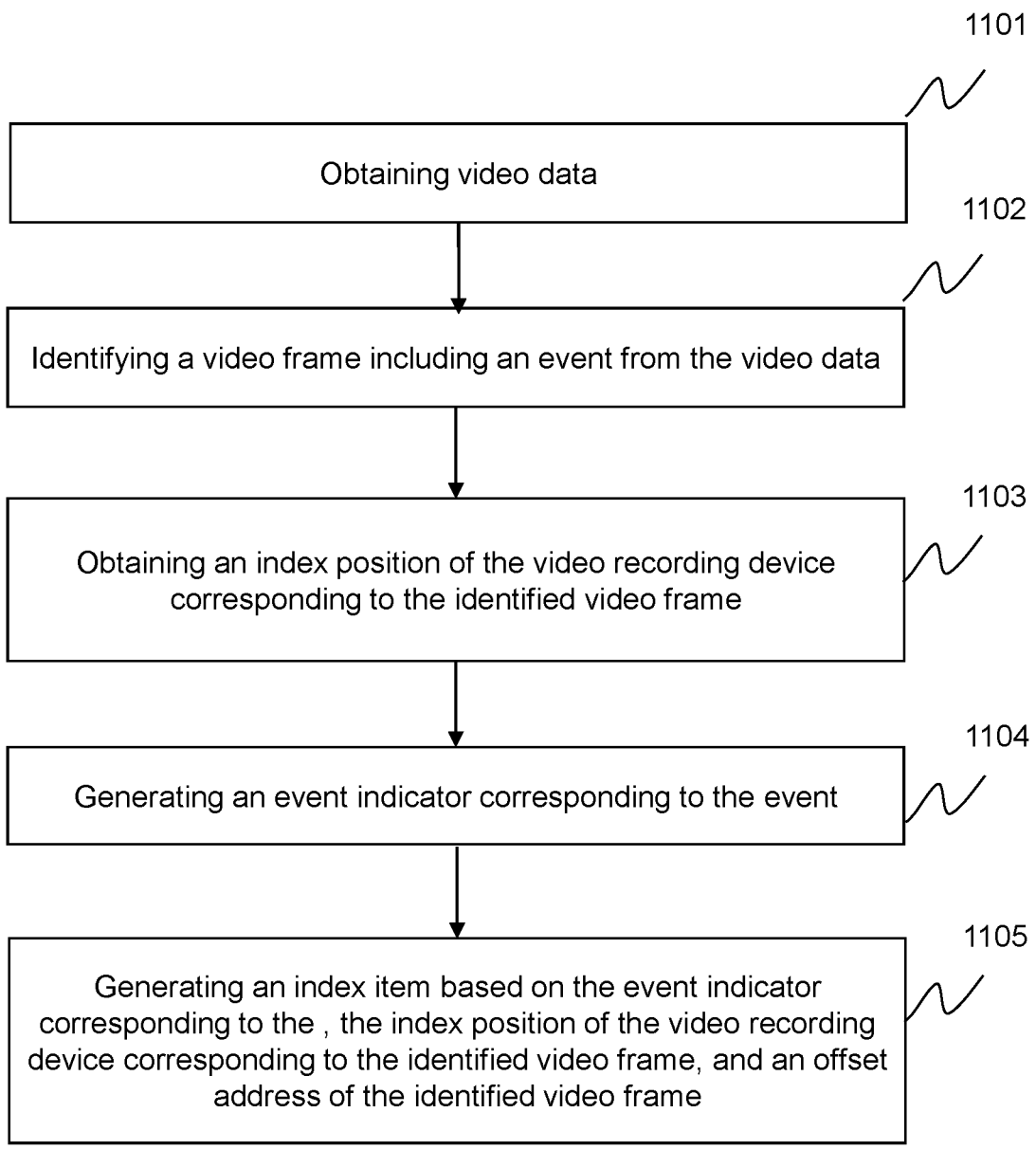
FIG. 11 is a flow chart illustrating an exemplary process for generating an index item in an index table according to some embodiments of the present disclosure.

FIG. 11 is a flow chart illustrating an exemplary process for generating an index item in an index table according to some embodiments of the present disclosure. In some embodiments, the process 1100 may be implemented on the video processing system 100 as illustrated in FIG. 1. For example, the process 1100 may be stored in a storage medium (e.g., the network storage device 113, or the storage 227 of the computing device 228) as a form of instructions, and invoked and/or executed by the media server 103. The operations in the process 1100 presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below may not be intended to be limiting.

In 1101, the media server 103 may obtain video data.

In some embodiments, the media server 103 may obtain video data from a video recording device. In some embodiments, the media server 103 may obtain the video data from the camera 102. In some embodiments, the camera 102 may include a PTZ head. The video data may include a plurality of video frames.

In 1102, the media server 103 may identify a video frame including an event from the video data.

In some embodiments, one or more events may be identified from the video frames or portions thereof of the video data. The one or more events may include, for example, a human face event, a license plate event, an invasion event, a violence event, an illegal event, or the like, or a combination thereof. The human face event may represent an appearance of a human face. The license plate event may represent an appearance of a license plate of a vehicle. The invasion event may represent a target object invades an area. The violence event may represent an occurrence of violent behavior. The illegal event may represent an occurrence of an illegal act. For example, if a video frame or a portion thereof includes a human face, the media server 103 may determine that the video frame includes a human face event, and identify the video frame from the video data.

In some embodiments, the media server 103 may identify, from the video data, a video frame or a portion thereof including an event according to an identification algorithm. Exemplary identification algorithms may include a scale-invariant feature transform (SIFT) algorithm, a speed up robust feature (SURF) algorithm, a features from accelerated segment test (FAST) algorithm, a binary robust independent elementary features (BRIEF) algorithm, an oriented FAST and rotated BRIEF (ORB) algorithm, or the like, or a combination thereof. In some embodiments, the media server 103 may obtain an event identification model, and identify, from the video data, a video frame including an event according to an identification model. In some embodiments, the media server 103 may identify a video frame or a portion thereof including an event by inputting video frames of the video data into the event identification model. Exemplary identification models may include a deep belief network (DBN), a Stacked Auto-Encoders (SAE), a logistic regression (LR) model, a support vector machine (SVM) model, a decision tree model, a Naive Bayesian Model, a random forest model, or a Restricted Boltzmann Machine (RBM), a Gradient Boosting Decision Tree (GBDT) model, a LambdaMART model, an adaptive boosting model, a recurrent neural network (RNN) model, a convolutional network model, a hidden Markov model, a perceptron neural network model, a Hopfield network model, or the like, or any combination thereof. In some embodiments, the event identification model may be a neural network model. In some embodiments, the event identification model may be trained based on a plurality of sample video frames (e.g., images) including various events. Features of the various events may be extracted from the plurality of sample video frames, and used to train the event identification model.

Merely for illustration purposes, during the training process of the event identification model regarding human face events, a plurality of sample video frames (e.g., images) including human face events may be obtained. Each of the plurality of sample video frames may include at least one human face. Features of the at least one human face in each of the plurality of sample video frames may be extracted. Exemplary features may include an outline of each human face, a size of an eye in each human face, a distance between two eyes in each human face, a distribution of two eyes, an nose, and/or a mouth in an human face relative to an outline of the human face, etc. The features may be in the form of a vector, a matrix, etc. In some embodiments, the features may be input into the event identification model to train the event identification model. The training process of the event identification model regarding human face events may terminate until a loss function (e.g., a cross-entropy loss function) reaches a convergence. Similarly, training process regarding other events may be performed for the event identification model.

After the event identification model is trained, the event identification model may be used to identify video frames including particular events. For example, upon receiving a video frame, the event identification model may output an indicator of an event included in the video frame. In some embodiments, the indicator may be the same as or correspond to the event indicator as described below in 1104.

In 1103, the media server 103 may obtain an index position of the video recording device corresponding to the identified video frame.

The media server 103 may obtain coordinates of the PTZ head corresponding to the identified video frame. The media server 103 may obtain coordinates of the PTZ head with various methods. In some embodiments, the media server 103 may obtain the coordinates of the PTZ head from, for example, a coordinate measuring device, a control element in the camera 102, or the like. The coordinates of the PTZ head may be determined as the index position of video recording device.

In some embodiments, the media server 103 may determine whether a video frame includes an event immediately after the video frame is obtained by the camera 102. In another word, the media server 103 may obtain video data, and identify a video frame including an event from the video data in real time. In this case, the media server 103 may obtain current coordinates of the PTZ head once the video frame is identified. In some embodiments, the media server 103 may transmit the current coordinates of the PTZ head to the camera 102 when the coordinates of the PTZ head change.

In 1104, the media server 103 may generate an event indicator corresponding to the event.

In some embodiments, an event indicator corresponding to each event may be generated. An event to be recorded may be stored into an index item in the form of a corresponding event indicator. For example, a human face event may be stored in the form of an event indicator of "0". Merely for illustration purposes, when the media server 103 identify a video frame including a human face from the video data obtained by the camera 102, the media server 103 may generate an event indicator of "0". As another example, a license plate event may be stored in the form of an event indicator "1". As a further example, an invasion event may be stored in the form of an event indicator "2".

In 1105, the media server 103 may generate an index item based on the event indicator corresponding to the event, the index position of the video recording device corresponding to the identified video frame, and an offset address of the identified video frame.

The media server 103 may generate the index item by storing the event indicator, the index position of the video recording device, and an offset address of the identified video frame into the index item. The offset address of the identified video frame refers to a storage address of the video frame in a storage device where the video data is stored (e.g., the buffer 106, the network storage devices 113, etc.). In some embodiments, the index item generated in 1105 may further include a frame type, a time stamp, and a frame length of the identified video frame. In this case, particular events may be recorded in the index table in the form of an index item, thus facilitating a fast search of a particular event occurred at a certain position, and improving the efficiency and effectiveness of video monitoring. Details regarding the index item can be found elsewhere in the present disclosure, for example, FIG. 12 and the descriptions thereof.

It should be noted that the event may be a continuous event corresponding to a plurality of video frames or an instant event corresponding to one video frame. In a case that the event corresponds to a plurality of video frames, a first frame including the event, which is recorded by the camera 102 at an earliest time among the plurality of video frames, may be obtained. Index data in the index item may correspond to the first frame. In some embodiments, the media server 103 may record other video frames (e.g., a last frame which is recorded by the camera 102 at a latest time among the plurality of video frames, a middle frame which is recorded by the camera 102 at an intermediate time between the earliest time and the latest time, etc.) during a video recording process, which is not limited in the present disclosure.

The index item may be further stored in an index table. The index table may include a plurality of index items. Each of the plurality of index items may be a row in the index table. In some embodiments, an identified video frame that includes an event may correspond to an index item of an index table.

It should be noted that the above description is merely provided for the purposes of illustration, and not intended to limit the scope of the present disclosure. For persons having ordinary skills in the art, multiple variations and modifications may be made under the teachings of the present disclosure. For example, the video recording device may include a processing unit configured to identify video frames including events immediately after the video frames are captured by the video recording device. As another example, an event indicator (e.g., "none", the alphabet "X", etc.) may be generated if a video frame does not include an event (e.g., the video frame merely includes a blank background). However, these variations and modifications fall in the scope of the present disclosure.

Figure 12:
FIG. 12 illustrates an exemplary index item corresponding to an event according to some embodiments of the present disclosure.

FIG. 12 illustrates an exemplary index item corresponding to an event according to some embodiments of the present disclosure. As illustrated in FIG. 12, an index item corresponding to an event may include, for example, a frame type 1210, a time stamp 1220, an offset address 1230, a frame length 1240, an index position of the PTZ head 1250, and an event indicator 1260. The frame type 1210 may be used to type of the video frame including the event. Exemplary frame types may include an intra-coded (I) frame, a predicted (P) frame, a bi-directional (B) frame, or the like, or a combination thereof. The time stamp 1220 may include time information of the video frame. The time information may indicate the time when the video frame is recorded. For example, the time information may include a specific date, a specific time point, etc. The offset address 1230 refers to an address where the video frame is stored in a storage device storing the video data (e.g., the buffer 106, the network storage devices 113, etc.). In some embodiments, the offset address 1230 may be a physical address relate to a storage medium (e.g., a hard disk). The frame length 1240 may refer to a length of the video frame. The index position of the PTZ head 1250 may refer to a position (e.g., represented by coordinates) of the PTZ head when the camera 102 records the video frame.

It should be noted that the index item corresponding to the event is merely provided for illustration purpose, and not intended to be limiting. In some embodiments, the media server 103 may record more information or less information of the video frame including the event during a video recording process, which is not limited in the present disclosure.

Figure 13A:
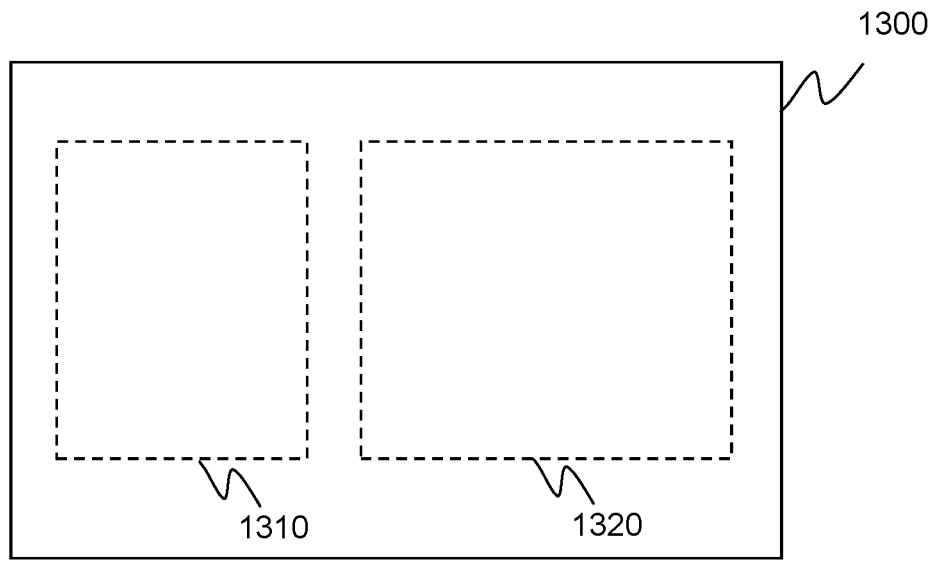
FIGS. 13A and 13B are schematic diagrams illustrating observation sites of the video recording device according to some embodiments of the present disclosure.
Figure 13B:
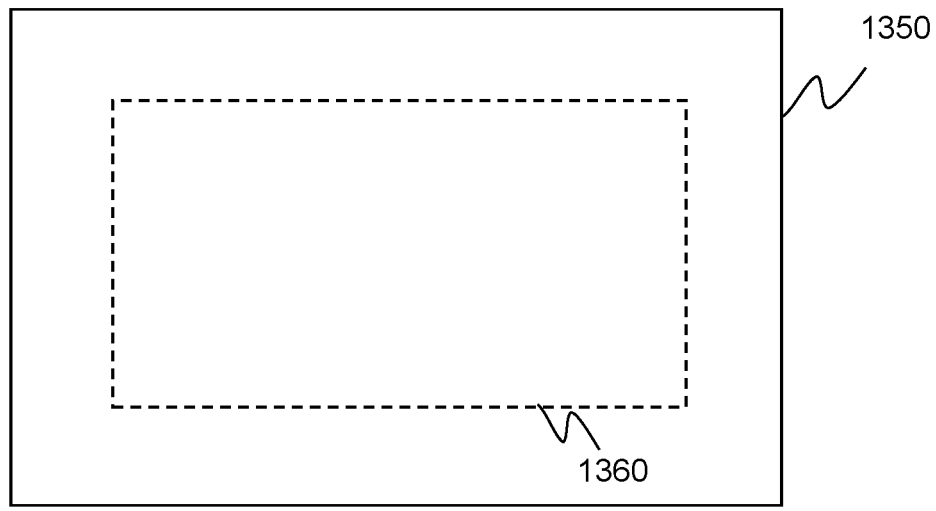

FIGS. 13A and 13B are schematic diagrams illustration observation sites of the video recording device according to some embodiments of the present disclosure. An observation site may correspond to an index position of the PTZ head. The index position of the PTZ head may be represented by coordinates of the index position of the PTZ head. In some embodiments, at least two observation sites may be set. The at least two observation sites may correspond to different index positions of the PTZ head. The video recording device may cruise periodically between the at least two observation sites. Various events at the at least two observation sites may be monitored by the video recording device. In some embodiments, video frames or portions thereof including particular events at the at least two observation sites may be identified and corresponding index items may be generated. For example, a video frame or a portion thereof including a human face event at a first observation site of the at least two observation sites may be identified and an index item corresponding to the human face event may be generated (e.g., according to the operations 1101 through 1105 in the process 1100). As another example, a video frame or a portion thereof including an invasion event at a second observation site of the at least two observation sites may be identified and an index item corresponding to the invasion event may be generated.

Merely for illustration purposes, a first observation site and a second observation site may be set. The two observation sites may correspond to different index positions of the PTZ head. The video recording device may cruise between the two observation sites. For example, in a cycle that the video recording device cruises between the two observation sites, the video recording device may monitor the first observation site for a first time period (e.g., 10 seconds, 30 seconds, 1 minute, 2 minutes, etc.), monitor the second observation site for a second time period (e.g., 15 seconds, 30 seconds, 1 minute, 5 minutes, etc.), and return back to the first observation site. The first time period and the second time period may be set by a user, according to default settings of the video processing system 100, etc.

Video data at the two observation sites may be obtained by the camera 102. As illustrated in FIGS. 13A and 13B, video data obtained at the first observation site may be presented (e.g., in the form of a first video) in a first view 1300, and video data obtained at the second observation site may be presented (e.g., in the form of a second video) in a second view 1350. One or more event detection regions may be set in the first view 1300 and the second view 1350. The one or more event detection regions may be configured to detect particular events in the regions. Video frames including the particular events may be identified and index items corresponding to the particular events may be generated. For example, a human face event detection region 1310 for detecting human face events in the region may be set on a left portion of the first view 1300. Video frames including human face events in the human face event region 1310 may be identified, and index items corresponding to the human face events may be generated. As another example, a license plate event detection region 1320 for detecting license plate events in the region may be set on a right portion of the first view 1300. Video frames including license plate events in the license plate event region 1320 may be identified, and index items corresponding to the license plate events may be generated. As a further example, an invasion event detection region 1360 for detecting invasion events in the region may be set in the second view 1350. Video frames including invasion events in the invasion event region 1360 may be identified, and index items corresponding to the invasion events may be generated.

Figure 14:
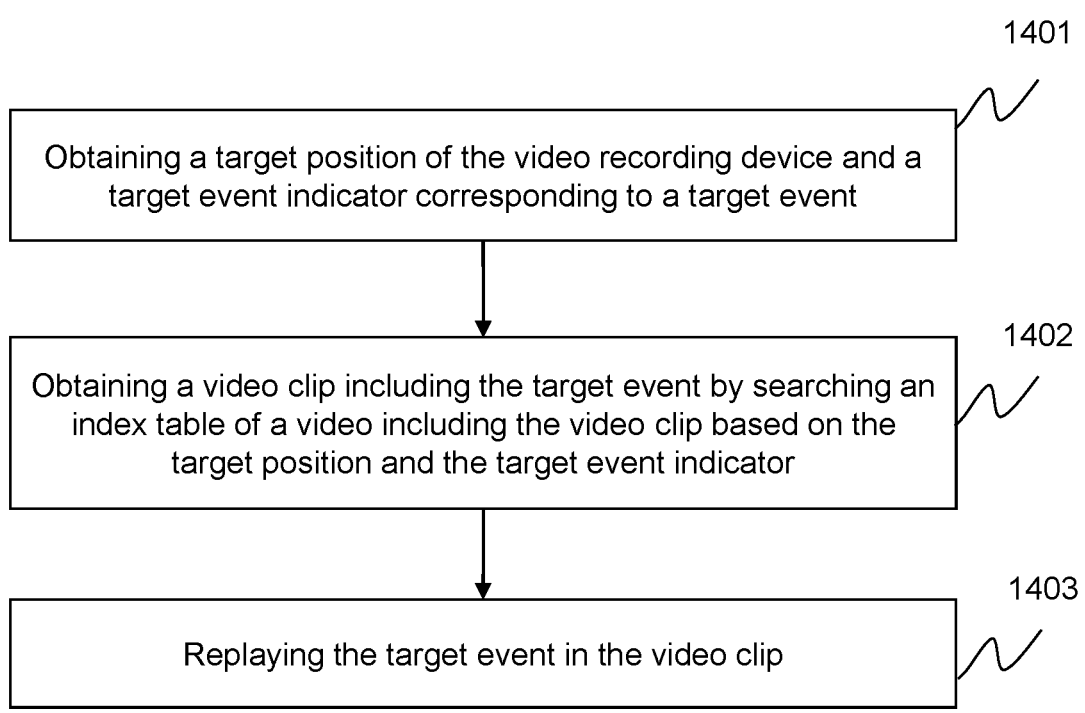
FIG. 14 is a flow chart illustrating an exemplary process for replaying a target event in a video clip according to some embodiments of the present disclosure.

FIG. 14 is a flow chart illustrating an exemplary process for replaying a target event in a video clip according to some embodiments of the present disclosure. In some embodiments, the process 1400 may be implemented on the video processing system 100 as illustrated in FIG. 1. For example, the process 1400 may be stored in a storage medium (e.g., the network storage device 113, or the storage 227 of the computing device 228) as a form of instructions, and invoked and/or executed by the media server 103. The operations in the process 1400 presented below are intended to be illustrative. In some embodiments, the process 1400 may be accomplished with one or more additional operations not described, and/or without one or more of the operations discussed. Additionally, the order in which the operations of the process 1400 as illustrated in FIG. 14 and described below may not be intended to be limiting.

In 1401, the media server 103 may obtain a target position of the video recording device and a target event indicator corresponding to a target event.

In some embodiments, the target position may correspond to the target event. For example, the target position may be a position of the video recording device when the camera 102 records one or more video frames including the target scene. The target position of the video recording device may be represented by a position of the PTZ head.

In 1402, the media server 103 may obtain a video clip including the target event by searching an index table of a video including the video clip based on the target position and the target event indicator.

In some embodiments, the media server 103 may determine a target index position of the video recording device by searching an index table based on the target position. The index table may index a plurality of positions of the video recording device. Specifically, the media server 103 may determine a target index position of the PTZ head in an index item from an index table being matched to the target position of the PTZ head.

During this process, the media server 103 may obtain coordinates of index positions of the PTZ head in one or more index items of an index table. In some embodiments, the media server 103 may obtain the coordinates of index positions of the PTZ head in the one or more index items one by one. After the media server 103 obtain coordinates of an index position of the PTZ head in an index item, the media server 103 may determine a difference between the coordinates of the index position of the PTZ head and coordinates of the target position of the PTZ head. Details regarding the determination of the target index position of the video recording device may be found elsewhere in the present disclosure, for example, FIGS. 4 and 10, and the descriptions thereof.

After the target index position of the video recording device is determined, the media server 103 may identify index items in the index table based on the target index position and the target event indicator. For example, the media server 103 may identify index items which include both the target index position and the target event indicator one by one. In some embodiments, none of the index items in the index table may be identified, which indicates that there is no such an event at the target position. In some embodiments, at least one index item in the index table may be identified based on the target index position and the target event indicator.

The media server 103 may determine an offset address from the identified index item. In some embodiments, the offset address may include a physical location related to a storage device (e.g., a hard disk) for storing video data. The offset address may be used to determine an address where a video frame corresponding to the target index position is stored (i.e., an address where a video clip corresponding to the target event is stored).

In some embodiments, the media server 103 may obtain the video clip including the target event as electronic signals based on the offset address. In some embodiments, the media server 103 may obtain the video clip based on the physical address of the video clip.

In 1403, the media server 103 may replay the target event in the video clip.

In some embodiments, the media server 103 may forward the video clip to the terminal 108 (e.g., the mobile device 109, the tablet computer 110, the laptop computer 111, etc.). The terminal 108 may include a screen. The video clip may be displayed on the screen of the terminal 108. The target event in the video clip may be replayed.

In some embodiments, at least two video clips are obtained, the at least two video clips may be replayed sequentially. In some embodiments, a selection request may be forward to the user of the terminal 108 (e.g., in the form of a dialog box). Upon receiving the selection request, the user may select at least one video clip and set a displaying order of the at least one video clip as response. In this case, a particular event occurred at a certain position may be searched and located in a video, thus improving the efficiency and effectiveness of video monitoring.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A system, comprising:
   at least one non-transitory storage medium, including a set of instructions for video replaying and video recording;

logic circuits in communication with the at least one storage medium, wherein when executing the set of instructions, the logic circuits are directed to:
obtain video data from a video recording device;
generate an index item corresponding to the video data if the video data includes a key frame, wherein the index item includes an index position of the video recording device corresponding to the key frame, and an offset address used to determine an address where the key frame is stored, wherein the index position of the video recording device includes coordinates of a PTZ head and the video recording device cruises periodically between at least two observation sites corresponding to at least two index positions; and
store an index table including at least the index item in a video.

2. The system of claim 1, wherein the logic circuits are further directed to:
identify a video frame including an event from the video data;
obtain an index position of the video recording device corresponding to the identified video frame;
generate an event indicator corresponding to the event; and
generate an index item based on the event indicator corresponding to the event, the index position of the video recording device corresponding to the identified video frame, and an offset address of the identified video frame.

3. The system of claim 2, wherein the index item further includes a frame type, a time stamp, and a frame length of the identified video frame.

4. The system of claim 2, wherein to identify the video frame including the event from the video data, the logic circuits are directed to:
obtain an event identification model; and
identify the video frame including the event by inputting video frames of the video data into the event identification model.

5. The system of claim 4, wherein the event identification model includes a neural network.

6. The system of claim 2, wherein the logic circuits being further directed to:
identify video frames including first events at a first observation site of the at least two observation sites; and
generate index items corresponding to the first events at the first observation site.

7. The system of claim 6, wherein the logic circuits are further directed to:
identify video frames including second events at a second observation site of the at least two observation sites; and
generate index items corresponding to the second events at the second observation site.

8. The system of claim 2, wherein the logic circuits are further directed to:
obtain a target position of the video recording device and a target event indicator corresponding to a target event;
obtain a video clip including the target event by searching the index table of the video including the video clip based on the target position and the target event indicator; and
replay the target event in the video clip.

9. The system of claim 8, wherein to obtain the video clip including the target event by searching the index table of the video including the video clip based on the target position and the target event indicator, the logic circuits are directed to:
determine a target index position of the video recording device by searching the index table based on the target position of the video recording device, wherein the index table indexes a plurality of positions of the video recording device;
identify an index item in the index table based on the target index position and the target event indicator corresponding to the target event;
determine an offset address from the identified index item, the offset address being used to determine an address where a video frame include the target event is stored; and
obtain the video clip including the target event based on the offset address.

10. The system of claim 1, wherein the logic circuits are further directed to:
obtain a target position of the video recording device corresponding to a target scene;
determine a target index position of the video recording device by searching the index table associated with the video based on the target position of the video recording device corresponding to the target scene, wherein the index table indexes a plurality of positions of the video recording device;
determine an offset address in the index table corresponding to the target index position of the video recording device, wherein the offset address is used to determine an address where a key frame corresponding to the target index position of the video recording device is stored;
obtain a video clip including the target scene based on the offset address; and
replay the target scene in the video clip.

11. A system, comprising:
at least one non-transitory storage medium, including a set of instructions for video replaying and video recording;
logic circuits in communication with the at least one storage medium, wherein when executing the set of instructions, the logic circuits are directed to:
obtain video data from a video recording device;
identify a video frame including an event from the video data;
obtain an index position of the video recording device corresponding to the identified video frame;
generate an event indicator corresponding to the event;
generate an index item based on the event indicator corresponding to the event, wherein the index item includes the index position of the video recording device corresponding to the identified video frame, and an offset address of the video frame, wherein the index position of the video recording device includes coordinates of a PTZ head and the video recording device cruises periodically between at least two observation sites corresponding to at least two index positions; and
store an index table including at least the index item in a video clip.

12. The system of claim 11, wherein the logic circuits being further directed to:
identify video frames including first events at a first observation site of the at least two observation sites; and generate index items corresponding to the first events at the first observation site.

13. The system of claim 12, wherein the logic circuits are further directed to:
identify video frames including second events at a second observation site of the at least two observation sites; and
generate index items corresponding to the second events at the second observation site.

14. The system of claim 11, wherein the logic circuits are further directed to:
obtain a target position of the video recording device and a target event indicator corresponding to a target event;
obtain a video clip including the target event by searching the index table of the video including the video clip based on the target position and the target event indicator; and
replay the target event in the video clip.

15. The system of claim 14, wherein to obtain the video clip including the target event by searching the index table of the video including the video clip based on the target position and the target event indicator, the logic circuits are directed to:
determine a target index position of the video recording device by searching the index table based on the target position of the video recording device, wherein the index table indexes a plurality of positions of the video recording device;
identify an index item in the index table based on the target index position and the target event indicator corresponding to the target event;
determine an offset address from the identified index item, the offset address being used to determine an address where a video frame include the target event is stored; and
obtain the video clip including the target event based on the offset address.

16. A method for video replaying and video recording, the method implemented on a computing device having at least one processor and at least one computer-readable storage medium, the method comprising:
obtaining video data from a video recording device;
generating an index item corresponding to the video data if the video data includes a key frame, wherein the index item includes an index position of the video recording device corresponding to the key frame, and an offset address used to determine an address where the key frame is stored, wherein the index position of the video recording device includes coordinates of a PTZ head and the video recording device cruises periodically between at least two observation sites corresponding to at least two index positions; and
storing an index table including at least the index item in a video.

17. The method of claim 16, further including:
identifying a video frame including an event from the video data;
obtaining an index position of the video recording device corresponding to the identified video frame;
generating an event indicator corresponding to the event; and
generating an index item based on the event indicator corresponding to the event, the index position of the video recording device corresponding to the identified video frame, and an offset address of the identified video frame.

18. The method of claim 17, wherein the method further including:
identifying video frames including first events at a first observation site of the at least two observation sites; and
generating index items corresponding to the first events at the first observation site.

19. The method of claim 17, further including:
obtaining a target position of the video recording device and a target event indicator corresponding to a target event;
obtaining a video clip including the target event by searching the index table of the video including the video clip based on the target position and the target event indicator; and
replaying the target event in the video clip.

20. The method of claim 19, wherein obtaining the video clip including the target event by searching the index table of the video including the video clip based on the target position and the target event indicator includes:
determining a target index position of the video recording device by searching the index table based on the target position of the video recording device, wherein the index table indexes a plurality of positions of the video recording device;
identifying an index item in the index table based on the target index position and the target event indicator corresponding to the target event;
determining an offset address from the identified index item, the offset address being used to determine an address where a video frame include the target event is stored; and
obtaining the video clip including the target event based on the offset address.

* * * * *